United States Patent
Wang et al.

(10) Patent No.: US 9,912,508 B2
(45) Date of Patent: Mar. 6, 2018

(54) INFORMATION PROCESSING APPARATUS, NETWORK NODE, AND INFORMATION PROCESSING METHOD

(71) Applicant: Huawei Technologies Co., Ltd., Shenzhen (CN)

(72) Inventors: Lei Wang, Shanghai (CN); Ye Wu, Shanghai (CN); Deli Qiao, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 15/216,441

(22) Filed: Jul. 21, 2016

(65) Prior Publication Data
US 2016/0330061 A1    Nov. 10, 2016

Related U.S. Application Data

(63) Continuation of application No. PCT/CN2014/071056, filed on Jan. 22, 2014.

(51) Int. Cl.
*H04L 27/26* (2006.01)
*H04B 7/04* (2017.01)
(Continued)

(52) U.S. Cl.
CPC ....... *H04L 27/2628* (2013.01); *H04B 7/0456* (2013.01); *H04B 7/068* (2013.01)

(58) Field of Classification Search
CPC .................................................. H04L 27/2628
See application file for complete search history.

(56) References Cited

U.S. PATENT DOCUMENTS 7,552,161 B2    6/2009  Schwoerer et al.
8,947,993 B2 *  2/2015  Park .................... H04L 27/2631
                                                370/203
(Continued)

FOREIGN PATENT DOCUMENTS

CN    101069398 A    11/2007
CN    101378299 A    3/2009
(Continued)

OTHER PUBLICATIONS

Auger et al., "Time Domain Precoding for MIMO-OFDM Systems," ETH Zurich, Communications Technology, XP009064369, Zurich, Switzerland (2005).
(Continued)

*Primary Examiner* — Ross Varndell
(74) *Attorney, Agent, or Firm* — Leydig, Voit & Mayer, Ltd.

(57) ABSTRACT

Embodiments of the present disclosure provide an information processing apparatus, a network node, and an information processing method. The information processing apparatus may include an inverse fast Fourier transform (IFFT) module, a precoding module, and a determining module. The IFFT module is configured to separately perform IFFT processing on N frequency-domain data streams to acquire N time-domain data streams, where N is a positive integer. The precoding module is configured to perform precoding processing on the N time-domain data streams to acquire a precoding processing result. The determining module is configured to determine, according to the precoding processing result, an orthogonal frequency division multiplexing OFDM symbol to be sent over each antenna of M antennas.

15 Claims, 3 Drawing Sheets

(51) Int. Cl.
*H04B 7/0456* (2017.01)
*H04B 7/06* (2006.01)

(56) References Cited

U.S. PATENT DOCUMENTS

| | | | |
|---|---|---|---|
| 2007/0291867 A1 | 12/2007 | Khan et al. | |
| 2010/0067512 A1* | 3/2010 | Nam | H04B 7/068 370/342 |
| 2010/0322349 A1 | 12/2010 | Lee et al. | |
| 2011/0149945 A1* | 6/2011 | Nakao | H04B 7/0434 370/344 |
| 2011/0205973 A1 | 8/2011 | Ogawa et al. | |
| 2011/0243272 A1 | 10/2011 | Hammarwall et al. | |
| 2012/0213181 A1 | 8/2012 | Walton et al. | |
| 2012/0307937 A1 | 12/2012 | Higuchi | |
| 2013/0100907 A1 | 4/2013 | Liu | |
| 2015/0124688 A1* | 5/2015 | Xu | H04B 7/0452 370/312 |

FOREIGN PATENT DOCUMENTS

| | | | |
|---|---|---|---|
| CN | 101631003 A | 1/2010 | |
| CN | 101867553 A | 10/2010 | |
| CN | 102263768 A | 11/2011 | |
| CN | 102546080 A | 7/2012 | |
| EP | 2028782 A2 | 2/2009 | |
| EP | 2574138 A1 | 3/2013 | |
| GB | 2433397 A * | 6/2007 | H04J 13/18 |
| JP | 2010011179 A | 1/2010 | |
| JP | 2011505087 A | 2/2011 | |
| RU | 2368079 C2 | 9/2009 | |
| WO | 2010050221 A1 | 5/2010 | |
| WO | 2011087039 A1 | 7/2011 | |
| WO | 2012108913 A1 | 8/2012 | |

OTHER PUBLICATIONS

Hui et al., "Cyclic Delay Diversity with Linear Precoding Technique adopted in OFDM Systems," XP31669630, Inha University, Incheon, Korea (Feb. 15-18, 2009).

* cited by examiner

INFORMATION PROCESSING APPARATUS, NETWORK NODE, AND INFORMATION PROCESSING METHOD

CROSS REFERENCE

This application is a continuation of International Application No. PCT/CN2014/071056, filed on Jan. 22, 2014, which is hereby incorporated by reference in its entirety.

TECHNICAL FIELD

The present disclosure relates to the field of communications, and in particular, to an information processing apparatus, a network node, and an information processing method.

BACKGROUND

Orthogonal frequency division multiplexing (OFDM) systems have good anti-attenuation performance and therefore are widely used in existing wireless communications systems. A time-domain signal of an OFDM system is generated by means of an inverse fast Fourier transform (IFFT) operation. The multiple-input multiple-output (MIMO) technology can significantly increase a channel capacity and therefore is also a commonly used technology for modern wireless communications. Many existing communications systems, for example, Long Term Evolution (LTE) and 802.11 communications systems, use both OFDM and MIMO. In this case, for sending of a data stream, a common implementation manner is as follows: first performing precoding processing on each coded and modulated data stream to obtain a frequency-domain data stream for each antenna, and then separately performing IFFT processing on the frequency-domain data stream for each antenna to obtain a time-domain signal on each antenna. For the foregoing implementation solution, a quantity of times of IFFT processing that needs to be performed is equal to a quantity of transmit antennas. Especially in an LSM system, because a quantity of antennas increases sharply, a quantity of times of IFFT processing that needs to be performed also increases sharply. Therefore, a large quantity of hardware resources need to be used, or a total runtime of an IFFT module needs to be increased, thereby reducing operating efficiency of the system.

SUMMARY

Embodiments of the present disclosure provide an information processing apparatus, a network node, and an information processing method, which can reduce hardware resource consumption or improve operating efficiency of a system.

According to a first aspect, an information processing apparatus is provided, including an IFFT module, a precoding module, and a determining module, where the IFFT module is configured to separately perform IFFT processing on N frequency-domain data streams to acquire N time-domain data streams, where N is a positive integer; the precoding module is configured to perform precoding processing on the N time-domain data streams to acquire a precoding processing result; and the determining module is configured to determine, according to the precoding processing result, an orthogonal frequency division multiplexing OFDM symbol that needs to be sent over each antenna of M antennas, so that an information transmission apparatus sends, by using each antenna of the M antennas, the OFDM symbol that needs to be sent over each antenna, where M is a positive integer greater than N.

With reference to the first aspect, in a first possible implementation manner of the first aspect, the N time-domain data streams are carried over S subbands, where S is a positive integer greater than or equal to 2, N is a positive integer greater than or equal to 2, and the subbands are configured to carry one or more time-domain data streams;

the precoding module is configured to: separately perform precoding processing on a time-domain data stream carried over each subband of the S subbands, to acquire the precoding processing result, where the precoding processing result includes a useful part, which is obtained by using the time-domain data stream carried over each subband, of the OFDM symbol that needs to be sent over each antenna; and the determining module is configured to: perform addition processing on useful parts, which are obtained by using the time-domain data streams carried over the S subbands, of OFDM symbols that need to be sent over a same antenna, to obtain an addition processing result corresponding to each antenna, and perform cyclic shift processing on the addition processing result corresponding to each antenna, to obtain the OFDM symbol that needs to be sent over each antenna.

With reference to the first aspect or any one of the foregoing possible implementation manners of the first aspect, in another possible implementation manner of the first aspect, the precoding module includes S precoding submodules that are in one-to-one correspondence with the S subbands, and the determining module includes M determining submodules that are in one-to-one correspondence with the M antennas;

each precoding submodule of the S precoding submodules is configured to perform precoding processing on a time-domain data stream carried over a corresponding subband to acquire the precoding processing result, where the precoding processing result includes the useful part, which is obtained by using the time-domain data stream carried over each subband, of the OFDM symbol that needs to be sent over each antenna; and the M determining submodules are configured to perform addition processing on useful parts, which are obtained by using the time-domain data streams carried over the S subbands, of OFDM symbols that need to be sent over a same antenna, to obtain an addition processing result corresponding to the M antennas, and perform cyclic shift processing on the addition processing result corresponding to the M antennas, to obtain OFDM symbols that need to be sent over the M antennas.

With reference to the first aspect and the foregoing implementation manners of the first aspect, in another possible implementation manner, the IFFT module is configured to:

when a quantity of data symbols of any frequency-domain data stream of the N frequency-domain data streams is less than a length of IFFT, perform zero padding on the frequency-domain data stream of the N frequency-domain data streams so that the quantity of the data symbols of the frequency-domain data stream is equal to the length of IFFT, and perform IFFT processing on the frequency-domain data stream after the zero padding.

With reference to the first aspect or any one of the foregoing possible implementation manners of the first aspect, in another possible implementation manner of the first aspect, the IFFT module includes N IFFT submodules that are in one-to-one correspondence with the N frequency-domain data streams, where each IFFT submodule of the N IFFT submodules is configured to separately perform IFFT processing on a corresponding frequency-domain data stream in the N frequency-domain data streams to acquire each time-domain data stream in the N time-domain data streams.

With reference to the first aspect or any one of the foregoing possible implementation manners of the first aspect, in another possible implementation manner of the first aspect, M is greater than or equal to 4N.

With reference to the first aspect or any one of the foregoing possible implementation manners of the first aspect, in another possible implementation manner of the first aspect, the information processing apparatus is a base band unit BBU, and the information transmission apparatus is a radio remote unit RRU.

According to a second aspect, an information processing apparatus is provided, including a memory and a processor, where program code is stored in the memory, and the processor is configured to invoke the program code to perform the following processing: separately performing IFFT processing on N frequency-domain data streams to acquire N time-domain data streams, where N is a positive integer; performing precoding processing on the N time-domain data streams to acquire a precoding processing result; and determining, according to the precoding processing result, an orthogonal frequency division multiplexing OFDM symbol that needs to be sent over each antenna of M antennas, so that an information transmission apparatus sends, by using each antenna of the M antennas, the OFDM symbol that needs to be sent over each antenna, where M is a positive integer greater than N.

With reference to the second aspect, in a first possible implementation manner of the second aspect, the N time-domain data streams are carried over S subbands, where S is a positive integer greater than or equal to 2, N is a positive integer greater than or equal to 2, and the subbands are configured to carry one or more time-domain data streams;

the processor is configured to invoke the program code to perform the following processing:

separately performing precoding processing on a time-domain data stream carried over each subband of the S subbands, to acquire the precoding processing result, where the precoding processing result includes a useful part, which is obtained by using the time-domain data stream carried over each subband, of the OFDM symbol that needs to be sent over each antenna; and performing addition processing on useful parts, which are obtained by using the time-domain data streams carried over the S subbands, of OFDM symbols that need to be sent over a same antenna, to obtain an addition processing result corresponding to each antenna, and performing cyclic shift processing on the addition processing result corresponding to each antenna, to obtain the OFDM symbol that needs to be sent over each antenna.

With reference to the second aspect or any one of the foregoing possible implementation manners of the second aspect, in another possible implementation manner of the second aspect, the processor is configured to invoke the program code to perform the following processing:

when a quantity of data symbols of any frequency-domain data stream of the N frequency-domain data streams is less than a length of IFFT, performing zero padding on the frequency-domain data stream so that the quantity of the data symbols of the frequency-domain data stream is equal to the length of IFFT; and performing IFFT processing on the frequency-domain data stream after the zero padding.

With reference to the second aspect or any one of the foregoing possible implementation manners of the second aspect, in another possible implementation manner of the second aspect, M is greater than or equal to 4N.

With reference to the second aspect or any one of the foregoing possible implementation manners of the second aspect, in another possible implementation manner of the second aspect, the information processing apparatus is a base band unit BBU, and the information transmission apparatus is a radio remote unit RRU.

According to a third aspect, a network node is provided, including the information processing apparatus according to the first aspect or any one of the implementation manners of the first aspect or including the information processing apparatus according to the second aspect or any one of the implementation manners of the second aspect, and an information transmission apparatus, where the information transmission apparatus sends, by using each antenna of M antennas, an orthogonal frequency division multiplexing OFDM symbol that needs to be sent over each antenna of the M antennas and that is determined by the information processing apparatus.

According to a fourth aspect, an information processing method is provided, including:

separately performing IFFT processing on N frequency-domain data streams to acquire N time-domain data streams, where N is a positive integer;

performing precoding processing on the N time-domain data streams to acquire a precoding processing result; and determining, according to the precoding processing result, an orthogonal frequency division multiplexing OFDM symbol that needs to be sent over each antenna of M antennas, so that an information transmission apparatus sends, by using each antenna of the M antennas, the OFDM symbol that needs to be sent over each antenna, where M is a positive integer greater than N.

With reference to the fourth aspect, in a first possible implementation manner of the fourth aspect, the N time-domain data streams are carried over S subbands, where S is a positive integer greater than or equal to 2, N is a positive integer greater than or equal to 2, and the subbands are configured to carry one or more time-domain data streams;

the performing precoding processing on the N time-domain data streams to acquire a precoding processing result includes: separately performing precoding processing on a time-domain data stream carried over each subband of the S subbands, to acquire the precoding processing result, where the precoding processing result includes a useful part, which is obtained by using the time-domain data stream carried over each subband, of the OFDM symbol that needs to be sent over each antenna; and the determining, according to the precoding processing result, an orthogonal frequency division multiplexing OFDM symbol that needs to be sent over each antenna of M antennas includes: performing addition processing on useful parts, which are obtained by using the time-domain data streams carried over the S subbands, of OFDM symbols that need to be sent over a same antenna, to obtain an addition processing result corresponding to each antenna, and performing cyclic shift processing on the addition processing result corresponding to each antenna, to obtain the OFDM symbols that need to be sent over each antenna.

With reference to the fourth aspect or any one of the foregoing possible implementation manners of the fourth aspect, in another possible implementation manner of the fourth aspect, the separately performing IFFT processing on the N frequency-domain data streams to acquire N time-domain data streams includes:

when a quantity of data symbols of any frequency-domain data stream of the N frequency-domain data streams is less than a length of IFFT, performing zero padding on the frequency-domain data stream so that the quantity of the data symbols of the frequency-domain data stream is equal to the length of IFFT; and performing IFFT processing on the frequency-domain data stream after the zero padding.

With reference to the fourth aspect or any one of the foregoing possible implementation manners of the fourth aspect, in another possible implementation manner of the fourth aspect, M is greater than or equal to 4N.

Therefore, in the embodiments of the present disclosure, IFFT processing is first performed on frequency-domain data streams to acquire time-domain data streams, where a quantity of times of IFFT processing performed on the frequency-domain data streams is equal to a quantity of frequency-domain data streams; then precoding processing is performed on the time-domain data streams to obtain a space-domain signal for each antenna. Therefore, in a system in which a quantity of antennas is greater than that of frequency-domain data streams, for example, in an LSM system, a quantity of times of IFFT processing that needs to be performed is equal to the quantity of the frequency-domain data streams, and the quantity of the frequency-domain data streams is less than the quantity of the antennas. Therefore, hardware resource consumption can be reduced, or a total time of IFFT processing can be reduced, so as to improve operating efficiency of the system.

BRIEF DESCRIPTION OF DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1:
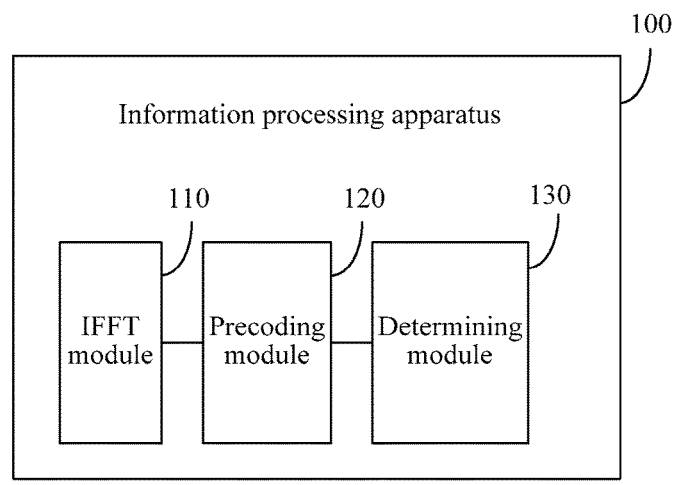
FIG. 1 is a schematic block diagram of an information processing apparatus according to an embodiment of the present disclosure.

FIG. 1 is a schematic block diagram of an information processing apparatus 100 according to an embodiment of the present disclosure. Optionally, the apparatus 100 may be a base station. As shown in FIG. 1, the apparatus 100 includes an IFFT module 110, a precoding module 120, and a determining module 130.

The IFFT module 110 is configured to separately perform IFFT processing on the N frequency-domain data streams to acquire N time-domain data streams, where N is a positive integer.

The precoding module 120 is configured to perform precoding processing on the N time-domain data streams to acquire a precoding processing result.

The determining module 130 is configured to determine, according to the precoding processing result, an orthogonal frequency division multiplexing (OFDM) symbol that needs to be sent over each antenna of M antennas, so that an information transmission apparatus sends, by using each antenna of the M antennas, the OFDM symbol that needs to be sent over each antenna, where M is a positive integer greater than N.

In this embodiment of the present disclosure, when receiving N data streams, the information processing apparatus (for example, a coding and modulation module in the information processing apparatus) may perform coding and modulation on the N data streams separately to obtain N frequency-domain data streams. Then, the IFFT module may separately perform IFFT processing on the N frequency-domain data streams to acquire N time-domain data streams. The precoding module performs precoding processing on the N time-domain data streams to acquire a precoding processing result. Then, the determining module may determine, according to the precoding processing result, an OFDM symbol that needs to be sent over each antenna of the M antennas. Therefore, the information transmission apparatus may send, by using each antenna of the M antennas, the OFDM symbol that needs to be sent over each antenna. Specifically, the information transmission apparatus may convert the OFDM symbol corresponding to each antenna into a radio frequency signal and then send the radio frequency signal over the corresponding antenna.

Therefore, it can be known from the above that, in this embodiment of the present disclosure, first, the IFFT module performs IFFT processing on frequency-domain data streams to acquire time-domain data streams, where a quantity of times of IFFT processing performed on the frequency-domain data streams is equal to a quantity of the frequency-domain data streams; then, the precoding module performs precoding processing on the time-domain data streams to obtain a space-domain signal for each antenna.

Therefore, in a system in which a quantity of antennas is greater than that of frequency-domain data streams, for example, in an LSM system, a quantity of times of IFFT processing that needs to be performed by the IFFT module is equal to the quantity of the frequency-domain data streams, and the quantity of the frequency-domain data streams is less than the quantity of the antennas. Therefore, hardware resource consumption can be reduced, or a total runtime of the IFFT module can be reduced, so as to improve operating efficiency of the system.

Specifically, the IFFT module may include N IFFT submodules, and each IFFT submodule of the N IFFT submodules may perform IFFT processing on a corresponding frequency-domain data stream in the N frequency-domain data streams once. Optionally, the IFFT submodules may be implemented by using hardware. Similarly, because the quantity of the frequency-domain data streams is less than the quantity of the antennas and the quantity of times of IFFT processing that needs to be performed is equal to the quantity of the frequency-domain data streams, a quantity of IFFT submodules that need to be implemented by using hardware is also small, thereby reducing hardware resource consumption. Optionally, the plurality of IFFT submodules may implement IFFT processing in parallel by means of function invoking. Similarly, because the quantity of the frequency-domain data streams is less than the quantity of the antennas and the quantity of times of IFFT processing that needs to be performed is equal to the quantity of the frequency-domain data streams, a quantity of IFFT submodules that operate in parallel is also small, thereby reducing hardware resource consumption. Alternatively, in this embodiment of the present disclosure, the IFFT module may implement IFFT processing in series by means of function invoking. Similarly, because the quantity of the frequency-domain data streams is less than the quantity of the antennas and the quantity of times of IFFT processing that needs to be performed is equal to the quantity of the frequency-domain data streams, the total runtime of the IFFT module can be reduced, so as to improve the operating efficiency of the system.

Optionally, in this embodiment of the present disclosure, the information processing apparatus 100 is a base band unit (BBU), and the information transmission apparatus is a radio remote unit (RRU).

Optionally, in this embodiment of the present disclosure, the IFFT module may be configured to: when a quantity of data symbols of any frequency-domain data stream of the N frequency-domain data streams is less than a length of IFFT, perform zero padding on the frequency-domain data stream of the N frequency-domain data streams so that the quantity of the data symbols of the frequency-domain data stream is equal to the length of IFFT, and perform IFFT processing on the frequency-domain data stream after the zero padding.

In this embodiment of the present disclosure, performing precoding processing on the time-domain data streams may be performing precoding processing corresponding to multiple-input multiple-output (MIMO), that is, precoding processing corresponding to single user MIMO (SU-MIMO) or precoding processing corresponding to multiple user MIMO (MU-MIMO), on the time-domain data streams.

Optionally, in this embodiment of the present disclosure, the IFFT module may include N IFFT submodules that are in one-to-one correspondence with the N frequency-domain data streams, and the determining module may include M determining submodules that are in one-to-one correspondence with the M antennas. Each IFFT submodule of the N IFFT submodules may be configured to separately perform IFFT processing on a corresponding frequency-domain data stream in the N frequency-domain data streams to acquire each time-domain data stream in the N time-domain data streams. The precoding module is configured to: perform precoding processing on the N time-domain data streams to acquire the precoding processing result, where the precoding processing result includes a useful part of the OFDM symbol that needs to be sent over each antenna. Each determining submodule of the M determining submodules is configured to acquire, according to a useful part of an OFDM symbol that needs to be sent over a corresponding antenna, the OFDM symbol that needs to be sent over the corresponding antenna. Optionally, when the N time-domain data streams are carried over S subbands, the precoding module may include S precoding submodules that are in one-to-one correspondence with the S subbands. Each precoding submodule of the S precoding submodules is configured to perform precoding processing on a time-domain data stream carried over a corresponding subband to acquire a precoding processing result, where the precoding processing result includes the useful part, which is obtained by using the time-domain data stream carried over each subband, of the OFDM symbol that needs to be sent over each antenna.

Optionally, in this embodiment of the present disclosure, M may be greater than or equal to 4N, and under this condition, the operating efficiency of the system can be greatly improved. Certainly, the protection scope of the present disclosure is not limited thereto, as long as a condition that M is greater than N is met.

Optionally, in this embodiment of the present disclosure, the useful part of the OFDM symbol indicates a part of the OFDM symbol other than a cyclic shift.

To understand the present disclosure more clearly, the following describes in detail two embodiments of the present disclosure: Embodiment A and Embodiment B.

Embodiment A

In Embodiment A, the precoding module may perform precoding processing on the N time-domain data streams by using one precoding matrix, to obtain the useful part of the OFDM symbol that needs to be sent over each antenna.

Figure 2:
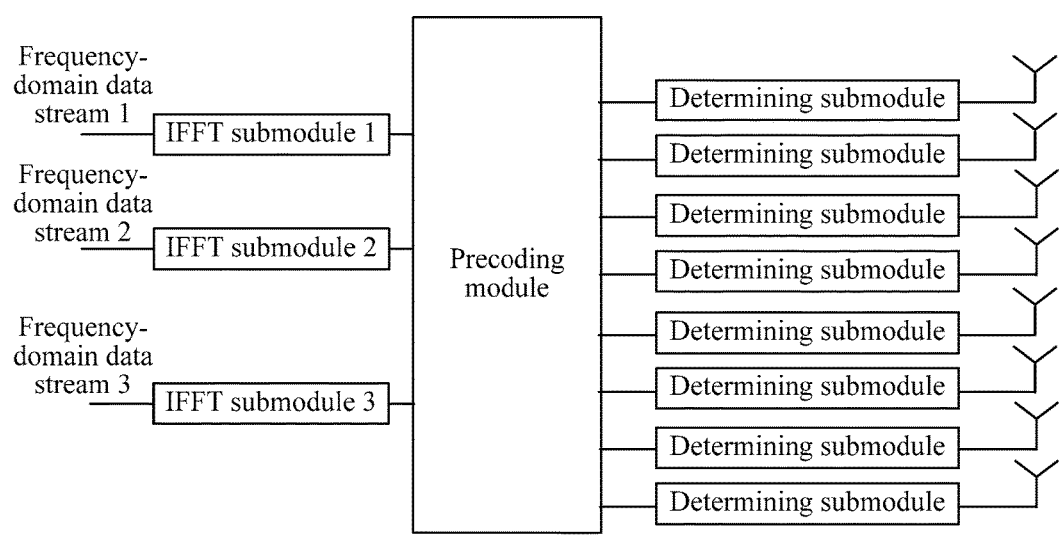
FIG. 2 is an implementation diagram of an information processing apparatus according to another embodiment of the present disclosure.

For example, as shown in FIG. 2, in FIG. 2, it is assumed that there are three data streams, and coding and modulation are separately performed on the three data streams to obtain three frequency-domain data streams, that is, a frequency-domain data stream 1, a frequency-domain data stream 2, and a frequency-domain data stream 3, where the frequency-domain data stream 1, the frequency-domain data stream 2, and the frequency-domain data stream 3 are carried over a same subband. An IFFT submodule 1, an IFFT submodule 2, and an IFFT submodule 3 perform IFFT processing on the frequency-domain data stream 1, the frequency-domain data stream 2, and the frequency-domain data stream 3, respectively. Then, the precoding module performs precoding processing on a time-domain data stream obtained by using the frequency-domain data stream 1, a time-domain data stream obtained by using the frequency-domain data stream 2, and a time-domain data stream obtained by using the frequency-domain data stream 3, where the precoding processing result includes the useful part of the OFDM symbol that needs to be sent over each antenna. Therefore, each determining submodule included in the determining module is configured to acquire, according to a useful part of an OFDM symbol that needs to be sent over a corresponding antenna, the OFDM symbol that needs to be sent over the corresponding antenna. Therefore, the information transmission apparatus (which is not shown) can send, by using each antenna, the OFDM symbol that needs to be sent over each antenna.

Specifically, a detailed description is provided below with reference to a specific embodiment. In this embodiment, it is assumed that the apparatus includes 500 antennas in total, and transfers eight data streams in total for a subframe. An OFDM system includes 500 subcarriers in total, which use a same precoding matrix P, where a length of IFFT is 512. The apparatus 100 may execute the following steps:

Step 1: A coding and modulation module acquires frequency-domain data streams corresponding to eight data streams.

The coding and modulation module performs coding and modulation on the eight data streams separately to generate corresponding frequency-domain data $x_n(k)$, where n is a sequence number of a data stream (n=1, 2, ..., 8), and k is a sequence number of a data symbol of a frequency-domain data stream (k=1, 2 ..., 500).

Step 2: An $n^{th}$ IFFT submodule in eight IFFT submodules performs IFFT processing on an $n^{th}$ frequency-domain data stream $x_n(k)$ of the eight frequency-domain data streams after zero padding, to obtain a time-domain data stream $y_n(i)$.

The $n^{th}$ IFFT submodule pads the $n^{th}$ frequency-domain data stream $x_n(k)$ with zeros to 512 points, and then performs IFFT processing on the $n^{th}$ frequency-domain data stream $x_n(k)$ after the zero padding, to obtain a corresponding time-domain data stream $y_n(i)$ (n=1, 2, ..., 8) (i=1, 2, ..., 512). A specific process may be shown by using the following formula 1:

$$y_n(i) = \text{IFFT}\{x_n(251), x_n(252), \ldots, x_n(500),$$
$$0, 0, \ldots, 0, x_n(1), x_n(2), \ldots, x_n(250)\}$$
$$n = 1, 2, \ldots, 8 \quad \text{Formula 1}$$

Step 3: A precoding module performs precoding processing on eight time-domain data streams acquired in step 2.

$$\begin{pmatrix} s_1(i) \\ s_2(i) \\ \ldots \\ s_{256}(i) \end{pmatrix} = P \begin{pmatrix} y_1(i) \\ y_2(i) \\ \ldots \\ y_8(i) \end{pmatrix}$$

is obtained by multiplying the precoding matrix P (where the matrix has a size of 256 rows by 8 columns) by a matrix $$\begin{pmatrix} y_1(i) \\ y_2(i) \\ \ldots \\ y_8(i) \end{pmatrix}$$

consisting of the time-domain data stream $y_n(i)$ (n=1, 2, 3, 4, 5, 6, 7, 8), where $s_m(i)$ includes a useful part of an OFDM symbol that needs to be sent over an antenna m, and m=1, 2, ..., 500.

Step 4: An $m^{th}$ determining module in a determining module determines, according to a useful part of an OFDM symbol that needs to be sent over an antenna m, the OFDM symbol that needs to be sent over the antenna m.

The $m^{th}$ determining module may perform cyclic shift processing on the useful part of the OFDM symbol that needs to be sent over the antenna m, and specifically, apply a cyclic shift, so as to obtain the OFDM symbol that needs to be sent over the antenna m.

Therefore, the information transmission apparatus can send, by using the antenna m, the OFDM symbol that needs to be sent over the antenna m.

Embodiment B

In Embodiment B, N frequency-domain data streams and N time-domain data streams may be carried over S subbands, where S is a positive integer greater than or equal to 2, and N is a positive integer greater than or equal to 2. One frequency-domain data stream and a time-domain data stream acquired based on the one frequency-domain data stream are carried over one subband, which means that each subband of the S subbands carries different frequency-domain data streams of the N frequency-domain data streams and different time-domain data streams of the N time-domain data streams. For example, a frequency-domain data stream 1 and a frequency-domain data stream 2, and a time-domain data stream 1 and a time-domain data stream 2 that are obtained based on the frequency-domain data stream 1 and the frequency-domain data stream 2 are carried over a subband 1; and a frequency-domain data stream 3 and a frequency-domain data stream 4, and a time-domain data stream 3 and a time-domain data stream 4 that are obtained based on the frequency-domain data stream 3 and the frequency-domain data stream 4 are carried over a subband 2. The precoding module may separately perform precoding processing on the time-domain data stream carried over each subband of the S subbands, to acquire a precoding processing result, where the precoding processing result includes a useful part, which is obtained by using the time-domain data stream carried over each subband, of an OFDM symbol that needs to be sent over each antenna. Then, the determining module performs addition processing on useful parts, which are obtained by using the time-domain data streams carried over the S subbands, of OFDM symbols that need to be sent over a same antenna, to obtain an addition processing result corresponding to each antenna, and performs cyclic shift processing on the addition processing result corresponding to each antenna, to obtain the OFDM symbol that needs to be sent over each antenna.

Specifically, the IFFT module may include N IFFT submodules that are in one-to-one correspondence with the N frequency-domain data streams, the precoding module may include S precoding submodules that are in one-to-one correspondence with the S subbands, and the determining module includes M determining submodules that are in one-to-one correspondence with the M antennas. Each IFFT submodule of the N IFFT submodules is configured to separately perform IFFT processing on a corresponding frequency-domain data stream in the N frequency-domain data streams, to acquire each time-domain data stream in the N time-domain data streams. Each precoding submodule of the S precoding submodules is configured to perform precoding processing on a time-domain data stream carried over a corresponding subband to acquire a precoding processing result, where the precoding processing result includes the useful part, which is obtained by using the time-domain data stream carried over each subband, of the OFDM symbol that needs to be sent over each antenna. The M determining submodules are configured to perform addition processing on useful parts, which are obtained by using the time-domain data streams carried over the S subbands, of OFDM symbols that need to be sent over a same antenna, to obtain an addition processing result corresponding to the M antennas, and perform cyclic shift processing on the addition processing result corresponding to the M antennas, to obtain the OFDM symbols that need to be sent over the M antennas.

Figure 3:
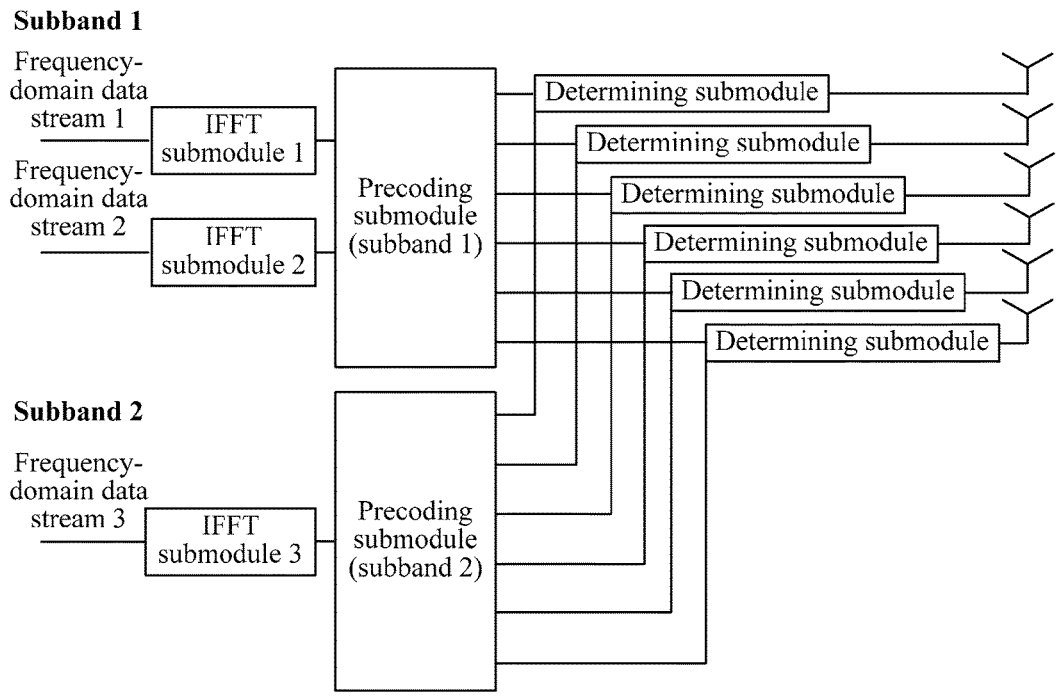
FIG. 3 is an implementation diagram of an information processing apparatus according to another embodiment of the present disclosure.

For example, as shown in FIG. 3, in FIG. 3, it is assumed that there are three data streams, and coding and modulation are separately performed on the three data streams to obtain three frequency-domain data streams, that is, a frequency-domain data stream 1, a frequency-domain data stream 2, and a frequency-domain data stream 3, where the frequency-domain data stream 1 and the frequency-domain data stream 2 are carried over a subband 1, and the frequency-domain data stream 3 is carried over a subband 2. An IFFT submodule 1, an IFFT submodule 2, and an IFFT submodule 3 perform IFFT processing on the frequency-domain data stream 1, the frequency-domain data stream 2, and the frequency-domain data stream 3, respectively. Then, a precoding module corresponding to the subband 1 performs precoding processing on a time-domain data stream obtained by using the frequency-domain data stream 1 and a time-domain data stream obtained by using the frequency-domain data stream 2 to obtain a useful part of an OFDM symbol that needs to be sent over each antenna and that is corresponding to the subband 1. A precoding module corresponding to the subband 2 performs precoding processing on a time-domain data stream obtained by using the frequency-domain data stream 3 to obtain a useful part of an OFDM symbol that needs to be sent over each antenna and that is corresponding to the subband 2. Then, each determining submodule is configured to perform addition processing on useful parts, which are obtained by using the time-domain data streams carried over the two subbands, of OFDM symbols that need to be sent over an antenna that is corresponding to each determining submodule, to obtain an addition processing result corresponding to the antenna that is corresponding to each determining submodule, and perform cyclic shift processing on the addition processing result corresponding to the antenna that is corresponding to each determining submodule, to obtain the OFDM symbols that need to be sent over the antenna that is corresponding to each determining submodule. Therefore, the information transmission apparatus can send, by using each antenna in a plurality of antennas, the OFDM symbol that needs to be sent over each antenna.

Specifically, a detailed description is provided below with reference to a specific embodiment. In this embodiment, it is assumed that the apparatus includes 500 antennas in total, and transfers eight data streams in total for a subframe. An OFDM system includes 500 subcarriers in total, which are grouped into two subbands, and corresponding precoding matrixes are P(1) and P(2), where a length of IFFT is 512. The apparatus 100 may execute the following steps:

Step 1: A coding and modulation module acquires frequency-domain data streams corresponding to eight data streams.

The modulation and coding module performs coding and modulation on the eight data streams separately to generate corresponding frequency-domain data $x_n(k)$, where n is a sequence number of a data stream (n=1, 2, . . . , 8), and k is a sequence number of a data symbol of a frequency-domain data stream (k=1, 2 . . . , 500). Frequency-domain data streams $x_n(k)$ (n=1, 2, 3, 4) are allocated to the subband 1, and frequency-domain data streams $x_n(k)$ (n=5, 6, 7, 8) are allocated to the subband 2.

Step 2: An $n^{th}$ IFFT submodule in eight IFFT submodules performs IFFT processing on an $n^{th}$ frequency-domain data stream $x_n(k)$ of the eight frequency-domain data streams after zero padding, to obtain a time-domain data stream $y_n(i)$.

The $n^{th}$ IFFT submodule pads the $n^{th}$ frequency-domain data stream $x_n(k)$ with zeros to 512 points, and then performs IFFT processing on the $n^{th}$ frequency-domain data stream $x_n(k)$ after the zero padding, to obtain a corresponding time-domain data stream $y_n(i)$ (n=1, 2, . . . , 8) (i=1, 2, . . . , 512). A specific process may be shown by using the following formula 1:

$$y_n(i) = \begin{cases} IFFT\{x_n(1), x_n(2), \ldots, x_n(250), 0, 0, \ldots, 0,\} & n = 1, 2, 3, 4 \\ IFFT\{0, 0, \ldots, 0, x_n(1), x_n(2), \ldots, x_n(250)\} & n = 5, 6, 7, 8 \end{cases}$$

$y_n(i)$ (n=1, 2, 3, 4) is carried over the subband 1, and $y_n(i)$ (n=5, 6, 7, 8) is carried over the subband 2.

Step 3: Perform precoding processing on eight time-domain data streams.

The precoding submodule corresponding to the subband 1 multiplies the precoding matrix P(1) (where the matrix has a size of 256 rows by 4 columns) by a matrix $$\begin{pmatrix} y_1(i) \\ y_2(i) \\ \ldots \\ y_4(i) \end{pmatrix}$$

consisting of the time-domain data stream $y_n(i)$ (n=1, 2, 3, 4) carried over the subband 1, to obtain $$\begin{pmatrix} s_1(i) \\ s_2(i) \\ \ldots \\ s_{256}(i) \end{pmatrix} = P(1) \begin{pmatrix} y_1(i) \\ y_2(i) \\ \ldots \\ y_4(i) \end{pmatrix},$$

where $s_m(i)$ is used to indicate a useful part, which is acquired by using the frequency-domain data streams carried over the subband 1, of an OFDM symbol that needs to be sent over an antenna m, and m=1, 2, . . . , 500.

The precoding submodule corresponding to the subband 2 multiplies the precoding matrix P(2) (where the matrix has a size of 256 rows by 4 columns) by a matrix $$\begin{pmatrix} y_5(i) \\ y_6(i) \\ \ldots \\ y_8(i) \end{pmatrix}$$

consisting of the time-domain data stream $y_n(i)$ (n=5, 6, 7, 8) carried over the subband 2, to obtain $$\begin{pmatrix} s_1(i) \\ s_2(i) \\ \ldots \\ s_{256}(i) \end{pmatrix} = P(1) \begin{pmatrix} y_5(i) \\ y_6(i) \\ \ldots \\ y_8(i) \end{pmatrix},$$

where $s_m(i)$ is used to indicate a useful part, which is acquired by using the frequency-domain data streams carried over the subband 2, of an OFDM symbol that needs to be sent over an antenna m.

Step 4: An $m^{th}$ determining module in a determining module determines, according to a useful part, which is acquired by using a time-domain data stream carried over each subband, of an OFDM symbol that needs to be sent over an antenna m, the OFDM symbol that needs to be sent over the antenna m.

First, $s_m^{(1)}(i)$ and $s_m^{(2)}(i)$ are added up, that is, $s_m(i)=s_m^{(1)}(i)+s_m^{(2)}(i)$ m=1, 2, . . . , 500. Then, a cyclic shift is applied to $s_m(i)$ to obtain the OFDM symbol that needs to be sent over the antenna m.

Therefore, the information transmission apparatus can send, by using the antenna m, the OFDM symbol that needs to be sent over the antenna m.

Therefore, in a system in which a quantity of antennas is greater than that of frequency-domain data streams, for example, in an LSM system, a quantity of times of IFFT processing that needs to be performed by the IFFT module is equal to the quantity of the frequency-domain data streams, and the quantity of the frequency-domain data streams is less than the quantity of the antennas. Therefore, hardware resource consumption can be reduced, or a total runtime of the IFFT module can be reduced, so as to improve operating efficiency of the system. In addition, in this embodiment of the present disclosure, N frequency-domain data streams and N time-domain data streams that are acquired by means of precoding processing performed based on the N frequency-domain data streams may be carried over S (where S is greater than or equal to 2) subbands. Different precoding matrixes may be used for time-domain data streams of different subbands, for example, a precoding matrix 1 is used for time-domain data streams on the subband 1, and a precoding matrix 2 is used for time-domain data streams on the subband 2, so as to better adapt to a channel status.

In this embodiment of the present disclosure, system performance can be ensured while reducing the hardware resource consumption or reducing the total runtime of the IFFT module. Specifically, this can be proved in the following manner:

It is assumed that $x_n^{(q)}(k)$ is an $n^{th}$ stream signal on a $k^{th}$ subcarrier of a subband q, $y_m(i)$ is an $i^{th}$ time-domain sampling point on an $n^{th}$ antenna, and $p_{m,n}^{(q)}$ is an element in row m and column n of a precoding matrix. If precoding processing is performed first and IFFT processing is then performed on the frequency-domain data streams according to the prior art, $$y_m(i) = IDFT\left\{\sum_q \sum_n x_n^{(q)}(k)p_{m,n}^{(q)}\right\}.$$

If IFFT processing is performed first and precoding processing is then performed on the frequency-domain data streams according to the present disclosure, $$y_m(i) = \sum_q \sum_n (p_{m,n} IDFT\{x_n(k)\}).$$

Because $$IDFT\left\{\sum_q \sum_n x_n^{(q)}(k)p_{m,n}^{(q)}\right\} = \sum_k \left(\left(\sum_q \sum_n x_n^{(q)}(k)p_{m,n}^{(q)}\right)e^{j\frac{2\pi}{N_{FFT}}ki}\right) =$$

$$\sum_q \sum_n \left(\sum_k x_n(k)p_{m,n}e^{j\frac{2\pi}{N_{FFT}}ki}\right) =$$

$$\sum_q \sum_n \left(p_{m,n}\left(\sum_k x_n(k)e^{j\frac{2\pi}{N_{FFT}}ki}\right)\right) = \sum_q \sum_n (p_{m,n}IDFT\{x_n(k)\})$$

that is, $$IDFT\left\{\sum_q \sum_n x_n^{(q)}(k)p_{m,n}^{(q)}\right\} = \sum_q \sum_n (p_{m,n}IDFT\{x_n(k)\}),$$

it indicates that regardless of whether IFFT processing is performed first and precoding processing is then performed or precoding processing is performed first and IFFT processing is then performed on the frequency-domain data streams, a same value is obtained. Therefore, the technical solution in this embodiment of the present disclosure can achieve the same system performance as that achieved by the technical solution of the prior art.

Therefore, in a system in which a quantity of antennas is greater than that of frequency-domain data streams, for example, in an LSM system, a quantity of times of IFFT processing that needs to be performed is equal to the quantity of the frequency-domain data streams, and the quantity of the frequency-domain data streams is less than the quantity of the antennas. Therefore, hardware resource consumption can be reduced, or a total runtime of the IFFT module can be reduced, so as to improve operating efficiency of the system. In addition, the present disclosure can achieve the same system performance as that achieved by the prior art.

Figure 4:
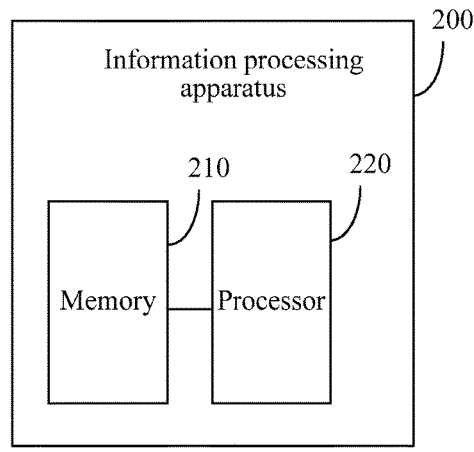
FIG. 4 is a schematic block diagram of an information processing apparatus according to another embodiment of the present disclosure.

FIG. 4 is a schematic block diagram of an information processing apparatus according to an embodiment of the present disclosure. As shown in FIG. 4, the apparatus 200 includes: a memory 210 and a processor 220. Program code is stored in the memory 210. The processor 220 can invoke the program code stored in the memory 210 to perform the following processing:

separately performing IFFT processing on N frequency-domain data streams to acquire N time-domain data streams, where N is a positive integer;

performing precoding processing on the N time-domain data streams to acquire a precoding processing result; and determining, according to the precoding processing result, an orthogonal frequency division multiplexing (OFDM) symbol that needs to be sent over each antenna of M antennas, so that an information transmission apparatus sends, by using each antenna of the M antennas, the OFDM symbol that needs to be sent over each antenna, where M is a positive integer greater than N.

Therefore, it can be known from the above that, in this embodiment of the present disclosure, first, IFFT processing is performed on frequency-domain data streams to acquire time-domain data streams, where a quantity of times of IFFT processing performed on the frequency-domain data streams is equal to a quantity of the frequency-domain data streams; then, precoding processing is performed on the time-domain data streams to obtain a space-domain signal for each antenna. Therefore, in a system in which a quantity of antennas is greater than that of frequency-domain data streams, for example, in an LSM system, a quantity of times of IFFT processing that needs to be performed is equal to the quantity of the frequency-domain data streams, and the quantity of the frequency-domain data streams is less than the quantity of the antennas. Therefore, hardware resource consumption can be reduced, or a total time of IFFT processing can be reduced, so as to improve operating efficiency of the system.

Optionally, in this embodiment of the present disclosure, the information processing apparatus 200 is a BBU, and the information transmission apparatus is an RRU.

Optionally, in this embodiment of the present disclosure, the processor 220 is configured to invoke the program code stored in the memory 210 to perform the following processing: when a quantity of data symbols of any frequency-domain data stream of the N frequency-domain data streams is less than a length of IFFT, performing zero padding on the frequency-domain data stream of the N frequency-domain data streams so that the quantity of the data symbols of the frequency-domain data stream is equal to the length of IFFT; and performing IFFT processing on the frequency-domain data stream after the zero padding.

Optionally, in this embodiment of the present disclosure, the N time-domain data streams are carried over S subbands, where S is a positive integer greater than or equal to 2, N is a positive integer greater than or equal to 2, and the subbands are configured to carry one or more time-domain data streams. In this case, the processor 220 is configured to invoke the program code stored in the memory 210 to perform the following processing: separately performing precoding processing on a time-domain data stream carried over each subband of the S subbands, to acquire the precoding processing result, where the precoding processing result includes a useful part, which is obtained by using the time-domain data stream carried over each subband, of an OFDM symbol that needs to be sent over each antenna; and performing addition processing on useful parts, which are obtained by using the time-domain data streams carried over the S subbands, of OFDM symbols that need to be sent over a same antenna, to obtain an addition processing result corresponding to each antenna, and performing cyclic shift processing on the addition processing result corresponding to each antenna, to obtain the OFDM symbol that needs to be sent over each antenna.

Optionally, in this embodiment of the present disclosure, M may be greater than or equal to 4N, and under this condition, the operating efficiency of the system can be greatly improved. Certainly, the protection scope of the present disclosure is not limited thereto, as long as a condition that M is greater than N is met.

Optionally, in this embodiment of the present disclosure, the useful part of the OFDM symbol indicates a part of the OFDM symbol other than a cyclic shift.

To understand the present disclosure more clearly, the following describes the corresponding processing executed by invoking, by the processor 220, the program code stored in the memory 210 with reference to two embodiments, that is, Embodiment C and Embodiment D.

Embodiment C

In Embodiment C, precoding processing may be performed on the N time-domain data streams by using one precoding matrix, to obtain a useful part of an OFDM symbol that needs to be sent over each antenna.

Specifically, a detailed description is provided below with reference to a specific embodiment. In this embodiment, it is assumed that the apparatus includes 500 antennas in total, and transfers eight data streams in total for a subframe. An OFDM system includes 500 subcarriers in total, which use a same precoding matrix P, where a length of IFFT is 512. The apparatus 100 may execute the following steps:

Step 1: Acquire frequency-domain data streams corresponding to eight data streams.

Coding and modulation are performed on the eight data streams separately to generate corresponding frequency-domain data $x_n(k)$, where n is a sequence number of a data stream (n=1, 2, ..., 8), and k is a sequence number of a data symbol of a frequency-domain data stream (k=1, 2 ..., 500).

Step 2: Perform IFFT processing on an $n^{th}$ frequency-domain data stream $x_n(k)$ of the eight frequency-domain data streams after zero padding, to obtain a time-domain data stream $y_n(i)$.

After the $n^{th}$ frequency-domain data stream $x_n(k)$ is padded with zeros to 512 points, IFFT processing is performed on the $n^{th}$ frequency-domain data stream $x_n(k)$ after the zero padding, to obtain a corresponding time-domain data stream $y_n(i)$ (n=1, 2, ..., 8) (i=1, 2, ..., 512). A specific process may be shown by using the following formula 1:

$$y_n(i)=\text{IFFT}\{x_n(251),x_n(252), \ldots, x_n(500),$$
$$0,0, \ldots, 0, x_n(1), x_n(2), \ldots, x_n(250)\}$$
$$n=1,2, \ldots, 8 \qquad \text{Formula 1}$$

Step 3: Perform precoding processing on eight time-domain data streams acquired in step 2.

$$\begin{pmatrix} s_1(i) \\ s_2(i) \\ \ldots \\ s_{256}(i) \end{pmatrix} = P \begin{pmatrix} y_1(i) \\ y_2(i) \\ \ldots \\ y_8(i) \end{pmatrix}$$

is obtained by multiplying the precoding matrix P (where the matrix has a size of 256 rows by 8 columns) by a matrix $$\begin{pmatrix} y_1(i) \\ y_2(i) \\ \ldots \\ y_8(i) \end{pmatrix}$$

consisting of the time-domain data stream $y_n(i)$ (n=1, 2, 3, 4, 5, 6, 7, 8), where $s_m(i)$ includes a useful part of an OFDM symbol that needs to be sent over an antenna m, and m=1, 2, ..., 500.

Step 4: Determine, according to a useful part of an OFDM symbol that needs to be sent over an antenna m, the OFDM symbol that needs to be sent over the antenna m.

Cyclic shift processing may be performed on the useful part of the OFDM symbol that needs to be sent over the antenna m, and specifically, a cyclic shift may be applied so as to obtain the OFDM symbol that needs to be sent over the antenna m.

Therefore, the information transmission apparatus can send, by using the antenna m, the OFDM symbol that needs to be sent over the antenna m.

Embodiment D

In Embodiment D, N frequency-domain data streams and N time-domain data streams may be carried over S subbands, where S is a positive integer greater than or equal to 2, and N is a positive integer greater than or equal to 2. One frequency-domain data stream and a time-domain data stream acquired based on the one frequency-domain data stream are carried over one subband, which means that each subband of the S subbands carries different frequency-domain data streams of the N frequency-domain data streams and different time-domain data streams of the N time-domain data streams. Precoding processing may be performed on the N time-domain data streams by using S precoding matrixes, to obtain a useful part of an OFDM symbol that needs to be sent over each antenna.

Specifically, a detailed description is provided below with reference to a specific embodiment. In this embodiment, it is assumed that the apparatus includes 500 antennas in total, and transfers eight data streams in total for a subframe. An OFDM system includes 500 subcarriers in total, which are grouped into two subbands, and corresponding precoding matrixes are P(1) and P(2), where a length of IFFT is 512. The apparatus 100 may execute the following steps:

Step 1: Acquire frequency-domain data streams corresponding to eight data streams.

Coding and modulation are performed on the eight data streams separately to generate corresponding frequency-domain data $x_n(k)$, where n is a sequence number of a data stream (n=1, 2 . . . , 8), and k is a sequence number of a data symbol of a frequency-domain data stream (k=1, 2 . . . , 500). Frequency-domain data streams $x_n(k)$ (n=1, 2, 3, 4) are allocated to a subband 1, and frequency-domain data streams $x_n(k)$ (n=5, 6, 7, 8) are allocated to a subband 2.

Step 2: Perform IFFT processing on an $n^{th}$ frequency-domain data stream $x_n(k)$ of the eight frequency-domain data streams after zero padding, to obtain a time-domain data stream $y_n(i)$.

After the $n^{th}$ frequency-domain data stream $x_n(k)$ is padded with zeros to 512 points, IFFT processing is performed on the $n^{th}$ frequency-domain data stream $x_n(k)$ after the zero padding, to obtain a corresponding time-domain data stream $y_n(i)$ (n=1, 2, . . . , 8) (i=1, 2, . . . , 512). A specific process may be shown by using the following formula 1:

$$y_n(i) = \begin{cases} IFFT\{x_n(1), x_n(2), \ldots, x_n(250), 0, 0, \ldots, 0,\} & n = 1, 2, 3, 4 \\ IFFT\{0, 0, \ldots, 0, x_n(1), x_n(2), \ldots, x_n(250)\} & n = 5, 6, 7, 8 \end{cases}$$

$y_n(i)$ (n=1, 2, 3, 4) is carried over the subband 1, and $y_n(i)$ (n=5, 6, 7, 8) is carried over the subband 2.

Step 3: Perform precoding processing on eight time-domain data streams.

$$\begin{pmatrix} s_1(i) \\ s_2(i) \\ \ldots \\ s_{256}(i) \end{pmatrix} = P(1) \begin{pmatrix} y_1(i) \\ y_2(i) \\ \ldots \\ y_4(i) \end{pmatrix}$$

is obtained by multiplying the precoding matrix P(1) (where the matrix has a size of 256 rows by 4 columns) by a matrix $$\begin{pmatrix} y_1(i) \\ y_2(i) \\ \ldots \\ y_4(i) \end{pmatrix}$$

consisting of the time-domain data stream $y_n(i)$ (n=1, 2, 3, 4) carried over the subband 1, where $s_m(i)$ is used to indicate a useful part, which is acquired by using the frequency-domain data streams carried over the subband 1, of an OFDM symbol that needs to be sent over an antenna m, and m=1, 2, . . . , 500.

$$\begin{pmatrix} s_1(i) \\ s_2(i) \\ \ldots \\ s_{256}(i) \end{pmatrix} = P(1) \begin{pmatrix} y_5(i) \\ y_6(i) \\ \ldots \\ y_8(i) \end{pmatrix}$$

is obtained by multiplying the precoding matrix P(2) (where the matrix has a size of 256 rows by 4 columns) by a matrix $$\begin{pmatrix} y_5(i) \\ y_6(i) \\ \ldots \\ y_8(i) \end{pmatrix}$$

consisting of the time-domain data stream $y_n$ (n=5, 6, 7, 8) carried over the subband 2, where $s_m(i)$ is used to indicate a useful part, which is acquired by using the frequency-domain data streams carried over the subband 2, of an OFDM symbol that needs to be sent over an antenna m.

Step 4: Determine, according to a useful part, which is acquired by using a time-domain data stream carried over each subband, of an OFDM symbol that needs to be sent over an antenna m, the OFDM symbol that needs to be sent over the antenna m.

First, $s_m^{(1)}(i)$ and $s_m^{(2)}(i)$ are added up, that is, $s_m(i)=s_m^{(1)}(i)+s_m^{(2)}(i)$ m=1, 2, . . . , 500. Then, a cyclic shift is applied to $s_m(i)$ to obtain the OFDM symbol that needs to be sent over the antenna m.

Therefore, the information transmission apparatus can send, by using the antenna m, the OFDM symbol that needs to be sent over the antenna m.

Therefore, in a system in which a quantity of antennas is greater than that of frequency-domain data streams, for example, in an LSM system, a quantity of times of IFFT processing that needs to be performed is equal to the quantity of the frequency-domain data streams, and the quantity of the frequency-domain data streams is less than the quantity of the antennas. Therefore, hardware resource consumption can be reduced, or a total time of IFFT processing can be reduced, so as to improve operating efficiency of the system. In addition, in this embodiment of the present disclosure, N frequency-domain data streams and N time-domain data streams that are acquired by means of precoding processing performed based on the N frequency-domain data streams may be carried over S (where S is greater than or equal to 2) subbands. Different precoding matrixes may be used for time-domain data streams of different subbands, for example, a precoding matrix 1 is used for time-domain data streams on the subband 1, and a precoding matrix 2 is used for time-domain data streams on the subband 2, so as to better adapt to a channel status.

In this embodiment of the present disclosure, system performance can be ensured while reducing the hardware resource consumption or reducing the time of IFFT processing. Specifically, this can be proved in the following manner:

It is assumed that $x_n^{(q)}(k)$ is an $n^{th}$ stream signal on a $k^{th}$ subcarrier of a subband n, $y_m(i)$ is an $n^{th}$ time-domain sampling point on an $i^{th}$ antenna, and $p_{m,n}^{(q)}$ is an element in row m and column n of a precoding matrix. If precoding processing is performed first and IFFT processing is then performed on the frequency-domain data streams according to the prior art, $$y_m(i) = IDFT\left\{\sum_q \sum_n x_n^{(q)}(k) p_{m,n}^{(q)}\right\}.$$

If IFFT processing is performed first and precoding processing is then performed on the frequency-domain data streams according to the present disclosure, $$y_m(i) = \sum_q \sum_n (p_{m,n} IDFT\{x_n(k)\}).$$

Because $$IDFT\left\{\sum_q \sum_n x_n^{(q)}(k) p_{m,n}^{(q)}\right\} = \sum_k \left(\left(\sum_q \sum_n x_n^{(q)}(k) p_{m,n}^{(q)}\right) e^{j\frac{2\pi}{N_{FFT}}ki}\right) =$$

$$\sum_q \sum_n \left(\sum_k x_n(k) p_{m,n} e^{j\frac{2\pi}{N_{FFT}}ki}\right) =$$

$$\sum_q \sum_n \left(p_{m,n} \left(\sum_k x_n(k) e^{j\frac{2\pi}{N_{FFT}}ki}\right)\right) = \sum_q \sum_n (p_{m,n} IDFT\{x_n(k)\})$$

that is, $$IDFT\left\{\sum_q \sum_n x_n^{(q)}(k) p_{m,n}^{(q)}\right\} = \sum_q \sum_n (p_{m,n} IDFT\{x_n(k)\}),$$

it indicates that regardless of whether IFFT processing is performed first and precoding processing is then performed or precoding processing is performed first and IFFT processing is then performed on the frequency-domain data streams, a same value is obtained. Therefore, the technical solution in this embodiment of the present disclosure can achieve the same system performance as that achieved by the technical solution of the prior art.

Therefore, in a system in which a quantity of antennas is greater than that of frequency-domain data streams, for example, in an LSM system, a quantity of times of IFFT processing that needs to be performed is equal to the quantity of the frequency-domain data streams, and the quantity of the frequency-domain data streams is less than the quantity of the antennas. Therefore, hardware resource consumption can be reduced, or a total time of IFFT processing can be reduced, so as to improve operating efficiency of the system. In addition, the present disclosure can achieve the same system performance as that achieved by the prior art.

Figure 5:
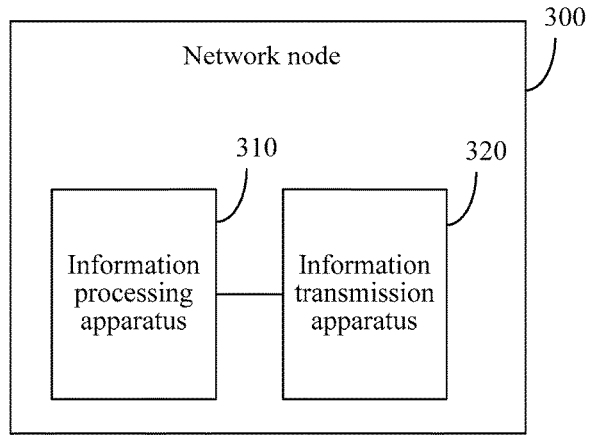
FIG. 5 is a schematic block diagram of a network node according to another embodiment of the present disclosure.

FIG. 5 is a schematic block diagram of a network node 300 according to an embodiment of the present disclosure. As shown in FIG. 5, the network node 300 includes: an information processing apparatus 310 and an information transmission apparatus 320.

The information processing apparatus 310 is configured to: separately perform IFFT processing on N frequency-domain data streams to acquire N time-domain data streams, where N is a positive integer; perform precoding processing on the N time-domain data streams to acquire a precoding processing result; and determine, according to the precoding processing result, an orthogonal frequency division multiplexing OFDM symbol that needs to be sent over each antenna of M antennas, so that the information transmission apparatus sends, by using each antenna of the M antennas, the OFDM symbol that needs to be sent over each antenna, where M is a positive integer greater than N.

The information transmission apparatus 320 may be configured to: send, by using each antenna of the M antennas, the orthogonal frequency division multiplexing OFDM symbol that needs to be sent over each antenna of the M antennas and that is determined by the information processing apparatus 310.

Optionally, in this embodiment of the present disclosure, the network node 300 may be a base station, the information processing apparatus 310 may be a BBU, and the information transmission apparatus 320 may be an RRU.

It should be understood that the information processing apparatus 310 included in the network node 300 may correspond to the information processing apparatus 100 or 200, which is not described herein again for the purpose of brevity.

Therefore, in a system in which a quantity of antennas is greater than that of frequency-domain data streams, for example, in an LSM system, a quantity of times of IFFT processing that needs to be performed is equal to the quantity of the frequency-domain data streams, and the quantity of the frequency-domain data streams is less than the quantity of the antennas. Therefore, hardware resource consumption can be reduced, or a total time of IFFT processing can be reduced, so as to improve operating efficiency of the system. In addition, the present disclosure can achieve the same system performance as that achieved by the prior art.

Figure 6:
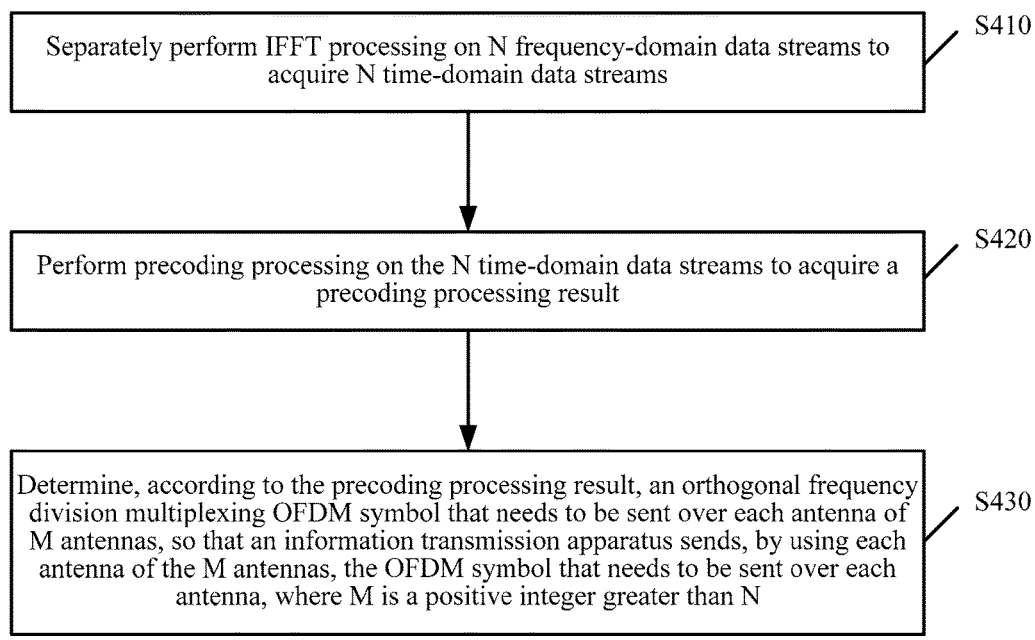
FIG. 6 is a schematic flowchart of an information processing method according to another embodiment of the present disclosure.

FIG. 6 is a schematic flowchart of an information processing method 400 according to an embodiment of the present disclosure. As shown in FIG. 6, the information processing method 400 includes:

S410: Separately perform IFFT processing on N frequency-domain data streams to acquire N time-domain data streams, where N is a positive integer.

S420: Perform precoding processing on the N time-domain data streams to acquire a precoding processing result.

S430: Determine, according to the precoding processing result, an orthogonal frequency division multiplexing OFDM symbol that needs to be sent over each antenna of M antennas, so that an information transmission apparatus sends, by using each antenna of the M antennas, the OFDM symbol that needs to be sent over each antenna, where M is a positive integer greater than N.

Therefore, it can be known from the above that, in this embodiment of the present disclosure, first, IFFT processing is performed on frequency-domain data streams to acquire time-domain data streams, where a quantity of times of IFFT processing performed on the frequency-domain data streams is equal to a quantity of the frequency-domain data streams; then, precoding processing is performed on the time-domain data streams to obtain a space-domain signal for each antenna. Therefore, in a system in which a quantity of antennas is greater than that of frequency-domain data streams, for example, in an LSM system, a quantity of times of IFFT processing that needs to be performed is equal to the quantity of the frequency-domain data streams, and the quantity of the frequency-domain data streams is less than the quantity of the antennas. Therefore, hardware resource consumption can be reduced, or a total time of IFFT processing can be reduced, so as to improve operating efficiency of the system.

Optionally, in this embodiment of the present disclosure, in S410, the separately performing IFFT processing on N frequency-domain data streams to acquire N time-domain data streams includes: when a quantity of data symbols of any frequency-domain data stream of the N frequency-domain data streams is less than a length of IFFT, performing zero padding on the frequency-domain data stream so that the quantity of the data symbols of the frequency-domain data stream is equal to the length of IFFT; and performing IFFT processing on the frequency-domain data stream after the zero padding.

Optionally, in this embodiment of the present disclosure, the N time-domain data streams are carried over S subbands, where S is a positive integer greater than or equal to 2, N is a positive integer greater than or equal to 2, and the subbands are configured to carry one or more time-domain data streams. Correspondingly, in S420, the performing precoding processing on the N time-domain data streams to acquire a precoding processing result may include: separately performing precoding processing on a time-domain data stream carried over each subband of the S subbands to acquire the precoding processing result, where the precoding processing result includes a useful part, which is obtained by using the time-domain data stream carried over each subband, of an OFDM symbol that needs to be sent over each antenna; in S430, the determining, according to the precoding processing result, an orthogonal frequency division multiplexing OFDM symbol that needs to be sent over each antenna of M antennas may include: performing addition processing on useful parts, which are obtained by using the time-domain data streams carried over the S subbands, of OFDM symbols that need to be sent over a same antenna, to obtain an addition processing result corresponding to each antenna, and performing cyclic shift processing on the addition processing result corresponding to each antenna, to obtain the OFDM symbol that needs to be sent over each antenna.

Optionally, in this embodiment of the present disclosure, M may be greater than or equal to 4N, and under this condition, the operating efficiency of the system can be greatly improved. Certainly, the protection scope of the present disclosure is not limited thereto, as long as a condition that M is greater than N is met.

Optionally, in this embodiment of the present disclosure, the useful part of the OFDM symbol indicates a part of the OFDM symbol other than a cyclic shift.

To understand the present disclosure more clearly, the following describes the information processing method 400 of this embodiment of the present disclosure with reference to two embodiments: Embodiment E and Embodiment F.

Embodiment E

In Embodiment E, precoding processing may be performed on the N time-domain data streams by using one precoding matrix, to obtain a useful part of an OFDM symbol that needs to be sent over each antenna.

Specifically, a detailed description is provided below with reference to a specific embodiment. In this embodiment, it is assumed that the apparatus includes 500 antennas in total, and transfers eight data streams in total for a subframe. An OFDM system includes 500 subcarriers in total, which use a same precoding matrix P, where a length of IFFT is 512. The apparatus 100 may execute the following steps:

Step 1: Acquire frequency-domain data streams corresponding to eight data streams.

Coding and modulation are performed on the eight data streams separately to generate corresponding frequency-domain data $x_n(k)$, where n is a sequence number of a data stream (n=1, 2 . . . , 8), and k is a sequence number of a data symbol of a frequency-domain data stream (k=1, 2 . . . , 500).

Step 2: Perform IFFT processing on an $n^{th}$ frequency-domain data stream $x_n(k)$ of the eight frequency-domain data streams after zero padding, to obtain a time-domain data stream $y_n(i)$.

After the $n^{th}$ frequency-domain data stream $x_n(k)$ is padded with zeros to 512 points, IFFT processing is performed on the $n^{th}$ frequency-domain data stream $x_n(k)$ after the zero padding, to obtain a corresponding time-domain data stream $y_n(i)$ (n=1, 2, . . . , 8) (i=1, 2, . . . , 512). A specific process may be shown by using the following formula 1:

$$y_n(i)=\text{IFFT}\{x_n(251),x_n(252), \ldots ,x_n(500),$$
$$0,0, \ldots ,0,x_n(1),x_n(2), \ldots ,x_n(250)\}$$
$$n=1,2 \ldots ,8 \quad \text{Formula 1}$$

Step 3: Perform precoding processing on eight time-domain data streams acquired in step 2.

$$\begin{pmatrix} s_1(i) \\ s_2(i) \\ \ldots \\ s_{256}(i) \end{pmatrix} = P \begin{pmatrix} y_1(i) \\ y_2(i) \\ \ldots \\ y_8(i) \end{pmatrix}$$

is obtained by multiplying the precoding matrix P (where the matrix has a size of 256 rows by 8 columns) by a matrix $$\begin{pmatrix} y_1(i) \\ y_2(i) \\ \ldots \\ y_8(i) \end{pmatrix}$$

consisting of the time-domain data stream $y_n(i)$ (n=1, 2, 3, 4, 5, 6, 7, 8), where $s_m(i)$ includes a useful part of an OFDM symbol that needs to be sent over an antenna m, and m=1, 2, . . . , 500.

Step 4: Determine, according to a useful part of an OFDM symbol that needs to be sent over an antenna m, the OFDM symbol that needs to be sent over the antenna m.

Cyclic shift processing may be performed on the useful part of the OFDM symbol that needs to be sent over the antenna m, and specifically, a cyclic shift may be applied, so as to obtain the OFDM symbol that needs to be sent over the antenna m.

Therefore, the information transmission apparatus can send, by using the antenna m, the OFDM symbol that needs to be sent over the antenna m.

Embodiment F

In this embodiment, N frequency-domain data streams and N time-domain data streams may be carried over S subbands, where S is a positive integer greater than or equal to 2, and N is a positive integer greater than or equal to 2. One frequency-domain data stream and a time-domain data stream acquired based on the one frequency-domain data stream are carried over one subband, which means that each subband of the S subbands carries different frequency-domain data streams of the N frequency-domain data streams and different time-domain data streams of the N time-domain data streams. Precoding processing may be performed on the N time-domain data streams by using S precoding matrixes, to obtain a useful part of an OFDM symbol that needs to be sent over each antenna.

Specifically, a detailed description is provided below with reference to a specific embodiment. In this embodiment, it is assumed that the apparatus includes 500 antennas in total, and transfers eight data streams in total for a subframe. An OFDM system includes 500 subcarriers in total, which are grouped into two subbands, and corresponding precoding matrixes are P(1) and P(2), where a length of IFFT is 512. The apparatus 100 may execute the following steps:

Step 1: Acquire frequency-domain data streams corresponding to eight data streams.

Coding and modulation are performed on the eight data streams separately to generate corresponding frequency-domain data $x_n(k)$, where n is a sequence number of a data stream (n=1, 2 ..., 8), and k is a sequence number of a data symbol of a frequency-domain data stream (k=1, 2 ..., 500). Frequency-domain data streams $x_n(k)$ (n=1, 2, 3, 4) are allocated to a subband 1, and frequency-domain data streams $x_n(k)$ (n=5, 6, 7, 8) are allocated to a subband 2.

Step 2: Perform IFFT processing on an $n^{th}$ frequency-domain data stream $x_n(k)$ of the eight frequency-domain data streams after zero padding, to obtain a time-domain data stream $y_n(i)$.

After the $n^{th}$ frequency-domain data stream $x_n(k)$ is padded with zeros to 512 points, IFFT processing is performed on the $n^{th}$ frequency-domain data stream $x_n(k)$ after the zero padding, to obtain a corresponding time-domain data stream $y_n(i)$ (n=1, 2, ..., 8) (i=1, 2, ..., 512). A specific process may be shown by using the following formula 1:

$$y_n(i) = \begin{cases} IFFT\{x_n(1), x_n(2), \ldots, x_n(250), 0, 0, \ldots, 0,\} & n = 1, 2, 3, 4 \\ IFFT\{0, 0, \ldots 0, x_n(1), x_n(2), \ldots, x_n(250)\} & n = 5, 6, 7, 8 \end{cases}$$

$y_n(i)$ (n=1, 2, 3, 4) is carried over the subband 1, and $y_n(i)$ (n=5, 6, 7, 8) is carried over the subband 2.

Step 3: Perform precoding processing on eight time-domain data streams.

$$\begin{pmatrix} s_1(i) \\ s_2(i) \\ \ldots \\ s_{256}(i) \end{pmatrix} = P(1) \begin{pmatrix} y_1(i) \\ y_2(i) \\ \ldots \\ y_4(i) \end{pmatrix}$$

is obtained by multiplying the precoding matrix P(1) (where the matrix has a size of 256 rows by 4 columns) by a matrix $$\begin{pmatrix} y_1(i) \\ y_2(i) \\ \ldots \\ y_4(i) \end{pmatrix}$$

consisting of the time-domain data stream $y_n(i)$ (n=1, 2, 3, 4) carried over the subband 1, where $s_m(i)$ is used to indicate a useful part, which is acquired by using the frequency-domain data streams carried over the subband 1, of an OFDM symbol that needs to be sent over an antenna m, and m=1, 2, ..., 500.

$$\begin{pmatrix} s_1(i) \\ s_2(i) \\ \ldots \\ s_{256}(i) \end{pmatrix} = P(1) \begin{pmatrix} y_5(i) \\ y_6(i) \\ \ldots \\ y_8(i) \end{pmatrix}$$

is obtained by multiplying the precoding matrix P(2) (where the matrix has a size of 256 rows by 4 columns) by a matrix $$\begin{pmatrix} y_5(i) \\ y_6(i) \\ \ldots \\ y_8(i) \end{pmatrix}$$

consisting of the time-domain data stream $y_n(i)$ (n=5, 6, 7, 8) carried over the subband 2, where $s_m(i)$ is used to indicate a useful part, which is acquired by using the frequency-domain data streams carried over the subband 2, of an OFDM symbol that needs to be sent over an antenna m.

Step 4: Determine, according to a useful part, which is acquired by using a time-domain data stream carried over each subband, of an OFDM symbol that needs to be sent over an antenna m, the OFDM symbol that needs to be sent over the antenna m.

First, $s_m^{(1)}(i)$ and $s_m^{(2)}(i)$ are added up, that is, $s_m(i)=s_m^{(1)}(i)+s_m^{(2)}(i)$ m=1, 2, ..., 500. Then, a cyclic shift is applied to $s_m(i)$ to obtain the OFDM symbol that needs to be sent over the antenna m.

Therefore, the information transmission apparatus can send, by using the antenna m, the OFDM symbol that needs to be sent over the antenna m.

Therefore, in a system in which a quantity of antennas is greater than that of frequency-domain data streams, for example, in an LSM system, a quantity of times of IFFT processing that needs to be performed is equal to the quantity of the frequency-domain data streams, and the quantity of the frequency-domain data streams is less than the quantity of the antennas. Therefore, hardware resource consumption can be reduced, or a total time of IFFT processing can be reduced, so as to improve operating efficiency of the system. In addition, in this embodiment of the present disclosure, N frequency-domain data streams and N time-domain data streams that are acquired by means of precoding processing performed based on the N frequency-domain data streams may be carried over S (where S is greater than or equal to 2) subbands. Different precoding matrixes may be used for time-domain data streams of different subbands, for example, a precoding matrix 1 is used for time-domain data streams on the subband 1, and a precoding matrix 2 is used for time-domain data streams on the subband 2, so as to better adapt to a channel status.

In this embodiment of the present disclosure, system performance can be ensured while reducing the hardware resource consumption or reducing the total time of IFFT processing. Specifically, this can be proved in the following manner:

It is assumed that $x_n^{(q)}(k)$ is an $n^{th}$ stream signal on a $k^{th}$ subcarrier of a subband q, $y_m(i)$ is an $i^{th}$ time-domain sampling point on an $n^{th}$ antenna, and $p_{m,n}^{(q)}$ is an element in row m and column n of a precoding matrix. If precoding processing is performed first and IFFT processing is then performed on the frequency-domain data streams according to the prior art, $$y_m(i) = IDFT\left\{\sum_q \sum_n x_n^{(q)}(k) p_{m,n}^{(q)}\right\}.$$

If IFFT processing is performed first and precoding processing is then performed on the frequency-domain data streams according to the present disclosure, $$y_m(i) = \sum_q \sum_n (p_{m,n} IDFT\{x_n(k)\}).$$

Because $$IDFT\left\{\sum_q \sum_n x_n^{(q)}(k) p_{m,n}^{(q)}\right\} = \sum_k \left(\left(\sum_q \sum_n x_n^{(q)}(k) p_{m,n}^{(q)}\right) e^{j\frac{2\pi}{N_{FFT}} ki}\right) =$$

$$\sum_q \sum_n \left(\sum_k x_n(k) p_{m,n} e^{j\frac{2\pi}{N_{FFT}} ki}\right) =$$

$$\sum_q \sum_n \left(p_{m,n}\left(\sum_k x_n(k) e^{j\frac{2\pi}{N_{FFT}} ki}\right)\right) = \sum_q \sum_n (p_{m,n} IDFT\{x_n(k)\})$$

that is, $$IDFT\left\{\sum_q \sum_n x_n^{(q)}(k) p_{m,n}^{(q)}\right\} = \sum_q \sum_n (p_{m,n} IDFT\{x_n(k)\}),$$

it indicates that regardless of whether IFFT processing is performed first and precoding processing is then performed or precoding processing is performed first and IFFT processing is then performed on the frequency-domain data streams, a same value is obtained. Therefore, the technical solution in this embodiment of the present disclosure can achieve the same system performance as that achieved by the technical solution of the prior art.

It should be noted that, in this embodiment of the present disclosure, the information processing method 400 may be implemented by the information processing apparatus 100 or 200. The embodiments of the information processing method 400 and the information processing apparatus 100 or 200 may be combined or may be described with reference to each other.

Therefore, in this embodiment of the present disclosure, in a system in which a quantity of antennas is greater than that of frequency-domain data streams, for example, in an LSM system, a quantity of times of IFFT processing that needs to be performed is equal to the quantity of the frequency-domain data streams, and the quantity of the frequency-domain data streams is less than the quantity of the antennas. Therefore, hardware resource consumption can be reduced, or a total time of IFFT processing can be reduced, so as to improve operating efficiency of the system. In addition, the present disclosure can achieve the same system performance as that achieved by the prior art.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the shown or discussed mutual couplings or direct couplings or communication connections may be implemented by using some interfaces. The indirect couplings or communication connections between the apparatuses or units may be implemented in electrical, mechanical, or other forms.

It may be understood by a person skilled in the art that the modules and submodules in the apparatus of the embodiments are merely used to better describe a logical entity or physical entity having the functions, and are not limited to the names defined in the embodiments. The modules and submodules in the apparatus of the embodiments may be distributed in the apparatus of the embodiments according to the descriptions in the embodiments, or may be correspondingly changed and located in one or more apparatuses that are different from the embodiments. The modules and submodules in the foregoing embodiments can be flexibly disassembled or combined during implementation.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An information processing apparatus, comprising:
a processor; and
a non-transitory computer-readable storage medium storing program codes that, when executed by the processor, implement a plurality of modules, the plurality of modules including an inverse fast Fourier transform (IFFT) module, a precoding module, and a determining module,
wherein:
the IFFT module is configured to separately perform IFFT processing on N frequency-domain data streams to acquire N time-domain data streams, wherein N is a positive integer;
the precoding module is configured to perform precoding processing on the N time-domain data streams to acquire a precoding processing result; and
the determining module is configured to determine, according to the precoding processing result, an orthogonal frequency division multiplexing (OFDM) symbol to be sent over each antenna of M antennas, so that an information transmission apparatus sends, by using each antenna of the M antennas, the OFDM symbol to be sent over each antenna, wherein M is a positive integer greater than N;
wherein the N time-domain data streams are carried over S subbands, wherein S is a positive integer greater than or equal to 2, N is a positive integer greater than or equal to 2, and the subbands are configured to carry one or more time-domain data streams;
wherein the precoding module is further configured to: separately perform precoding processing on a time-domain data stream carried over each subband of the S subbands, to acquire the precoding processing result, wherein the precoding processing result comprises a useful part, which is obtained by using the time-domain data stream carried over each subband, of the OFDM symbol to be sent over each antenna; and
wherein the determining module is further configured to: perform addition processing on useful parts, which are obtained by using the time-domain data streams carried over the S subbands, of OFDM symbols to be sent over a same antenna, to obtain an addition processing result corresponding to each antenna, and perform cyclic shift processing on the addition processing result corresponding to each antenna, to obtain the OFDM symbol to be sent over each antenna.

2. The apparatus according to claim 1, wherein the precoding module comprises S precoding submodules that are in one-to-one correspondence with the S subbands, and the determining module comprises M determining submodules that are in one-to-one correspondence with the M antennas;
each precoding submodule of the S precoding submodules is configured to perform precoding processing on a time-domain data stream carried over a corresponding subband to acquire the precoding processing result, wherein the precoding processing result comprises the useful part, which is obtained by using the time-domain data stream carried over each subband, of the OFDM symbol to be sent over each antenna; and
the M determining submodules are configured to perform addition processing on useful parts, which are obtained by using the time-domain data streams carried over the S subbands, of OFDM symbols to be sent over a same antenna, to obtain an addition processing result corresponding to the M antennas, and perform cyclic shift processing on the addition processing result corresponding to the M antennas, to obtain OFDM symbols to be sent over the M antennas.

3. The apparatus according to claim 1, wherein the IFFT module is further configured to:
in response to determining that a quantity of data symbols of any frequency-domain data stream of the N frequency-domain data streams is less than a length of IFFT, perform zero padding on the frequency-domain data stream so that the quantity of the data symbols of the frequency-domain data stream is equal to the length of IFFT, and perform IFFT processing on the frequency-domain data stream after the zero padding.

4. The apparatus according to claim 1, wherein the IFFT module comprises N IFFT submodules that are in one-to-one correspondence with the N frequency-domain data streams, wherein
each IFFT submodule of the N IFFT submodules is configured to separately perform IFFT processing on a corresponding frequency-domain data stream in the N frequency-domain data streams to acquire each time-domain data stream in the N time-domain data streams.

5. The apparatus according to claim 1, wherein M is greater than or equal to 4N.

6. The apparatus according to claim 1, wherein the information processing apparatus is a base band unit (BBU), and the information transmission apparatus is a radio remote unit (RRU).

7. The apparatus according to claim 1, wherein the information processing apparatus comprises a network node.

8. The apparatus according to claim 1, wherein the information processing apparatus comprises a network node, and the network node further includes:
an information transmission apparatus, wherein the information transmission apparatus sends, by using each antenna of the M antennas, the OFDM symbol to be sent over each antenna of the M antennas and that is determined by the information processing apparatus.

9. An information processing apparatus, comprising:
a processor; and
a memory, wherein program code is stored in the memory, and the processor is configured to invoke the program code to perform the following steps:
separately performing inverse fast Fourier transform (IFFT) processing on N frequency-domain data streams to acquire N time-domain data streams, wherein N is a positive integer;
performing precoding processing on the N time-domain data streams to acquire a precoding processing result; and
determining, according to the precoding processing result, an orthogonal frequency division multiplexing (OFDM) symbol to be sent over each antenna of M antennas, so that an information transmission apparatus sends, by using each antenna of the M antennas, the OFDM symbol to be sent over each antenna, wherein M is a positive integer greater than N;
wherein the N time-domain data streams are carried over S subbands, wherein S is a positive integer greater than or equal to 2, N is a positive integer greater than or equal to 2, and the subbands are configured to carry one or more time-domain data streams;

wherein the processor is configured to invoke the program code to further perform the following steps:
separately performing precoding processing on a time-domain data stream carried over each subband of the S subbands, to acquire a precoding processing result, wherein the precoding processing result comprises a useful part, which is obtained by using the time-domain data stream carried over each subband, of the OFDM symbol to be sent over each antenna; and
performing addition processing on useful parts, which are obtained by using the time-domain data streams carried over the S subbands, of OFDM symbols to be sent over a same antenna, to obtain an addition processing result corresponding to each antenna, and performing cyclic shift processing on the addition processing result corresponding to each antenna, to obtain the OFDM symbol to be sent over each antenna.

10. The apparatus according to claim 9, wherein the processor is configured to invoke the program code to further perform the following steps:
in response to determining that a quantity of data symbols of any frequency-domain data stream of the N frequency-domain data streams is less than a length of IFFT, performing zero padding on the frequency-domain data stream so that the quantity of the data symbols of the frequency-domain data stream is equal to the length of IFFT; and
performing IFFT processing on the frequency-domain data stream after the zero padding.

11. The apparatus according to claim 9, wherein M is greater than or equal to 4N.

12. The apparatus according to claim 9, wherein the information processing apparatus is a base band unit (BBU), and the information transmission apparatus is a radio remote unit (RRU).

13. An information processing method, comprising:
separately performing inverse fast Fourier transform (IFFT) processing on N frequency-domain data streams to acquire N time-domain data streams, wherein N is a positive integer;
performing precoding processing on the N time-domain data streams to acquire a precoding processing result; and
determining, according to the precoding processing result, an orthogonal frequency division multiplexing (OFDM) symbol to be sent over each antenna of M antennas, so that an information transmission apparatus sends, by using each antenna of the M antennas, the OFDM symbol to be sent over each antenna, wherein M is a positive integer greater than N;
wherein the N time-domain data streams are carried over S subbands, wherein S is a positive integer greater than or equal to 2, N is a positive integer greater than or equal to 2, and the subbands are configured to carry one or more time-domain data streams;
wherein the performing precoding processing on the N time-domain data streams to acquire a precoding processing result comprises: separately performing precoding processing on a time-domain data stream carried over each subband of the S subbands to acquire the precoding processing result, wherein the precoding processing result comprises a useful part, which is obtained by using the time-domain data stream carried over each subband, of the OFDM symbol to be sent over each antenna; and
wherein the determining, according to the precoding processing result, an orthogonal frequency division multiplexing OFDM symbol to be sent over each antenna of M antennas comprises: performing addition processing on useful parts, which are obtained by using the time-domain data streams carried over the S subbands, of OFDM symbols to be sent over a same antenna, to obtain an addition processing result corresponding to each antenna, and performing cyclic shift processing on the addition processing result corresponding to each antenna, to obtain the OFDM symbol to be sent over each antenna.

14. The method according to claim 13, wherein the separately performing IFFT processing on the N frequency-domain data streams to acquire N time-domain data streams comprises:
in response to determining that a quantity of data symbols of any frequency-domain data stream of the N frequency-domain data streams is less than a length of IFFT, performing zero padding on the frequency-domain data stream so that the quantity of the data symbols of the frequency-domain data stream is equal to the length of IFFT; and
performing IFFT processing on the frequency-domain data stream after the zero padding.

15. The method according to claim 13, wherein M is greater than or equal to 4N.

* * * * *